United States Patent [19]

Shishkin et al.

[11] Patent Number: 4,764,237
[45] Date of Patent: Aug. 16, 1988

[54] METHOD OF COATING THE INTERNAL SURFACE OF A PIPELINE WITH A CEMENT-SAND MORTAR AND A DEVICE FOR EFFECTING SAME

[75] Inventors: Viktor V. Shishkin; Nikolai F. Kryazhevskikh, both of Krasnodar; Viktor N. Oleinik, Moscow; Boris I. Shlatgauer; Vladimir L. Medunitsa, both of Severo-Kazakhstanskaya, all of U.S.S.R.

[73] Assignee: Trest "Juzhvodoprovod", Krasnodar, U.S.S.R.

[21] Appl. No.: 882,891
[22] PCT Filed: Oct. 16, 1985
[86] PCT No.: PCT/SU85/00091
§ 371 Date: Jun. 9, 1986
§ 102(e) Date: Jun. 9, 1986
[87] PCT Pub. No.: WO86/02428
PCT Pub. Date: Apr. 24, 1986

[30] Foreign Application Priority Data

Oct. 17, 1984 [SU] U.S.S.R. .............................. 3797407
Oct. 17, 1984 [SU] U.S.S.R. .............................. 3797423
Oct. 17, 1984 [SU] U.S.S.R. .............................. 3797422
Oct. 17, 1984 [SU] U.S.S.R. .............................. 3797408
Oct. 17, 1984 [SU] U.S.S.R. .............................. 3797908

[51] Int. Cl.[4] ..................... B32B 31/00; B05D 7/22; B05C 3/02
[52] U.S. Cl. .................................... 156/294; 118/408; 118/419; 118/DIG. 10; 156/287; 264/269; 264/516; 405/150; 427/230; 427/239

[58] Field of Search ............... 427/230, 239; 118/408, 118/419, DIG. 10; 156/287, 294; 405/150; 264/269, 516

[56] References Cited

U.S. PATENT DOCUMENTS 4,556,580 12/1985 Kamura et al. ..................... 427/230
4,602,974 7/1986 Wood et al. ........................ 427/230

FOREIGN PATENT DOCUMENTS 1489570 10/1977 United Kingdom .
2082285 3/1982 United Kingdom .
2085112 4/1982 United Kingdom .

Primary Examiner—Janyce A. Bell
Attorney, Agent, or Firm—Lilling & Greenspan

[57] ABSTRACT

According to the method of coating the internal surface of a pipeline with a cement-sand mortar, a layer (4) of the mortar is formed on said surface and is pressed and held by a flexible hose (5). Before the flexible hose is pressed to the mortar layer (4) the flexible hose (5) is turned out and placed simultaneously with the formation of the mortar layer. The device effecting the method as claimed has a cement-sand fed system (11), a piston (3) arrnged in the pipeline (1) with an annular clearance (12) to distribute the mortar layer on the internal surface of the pipeline, a chamber (13) accommodating the flexible hose (5) and communicating therewith by a flowing medium feed system (15), said flowing medium serving as a means for feeding, turning out and pressing the flexible hose (5) to the mortar layer (4) formed on the surface of the pipeline.

13 Claims, 4 Drawing Sheets

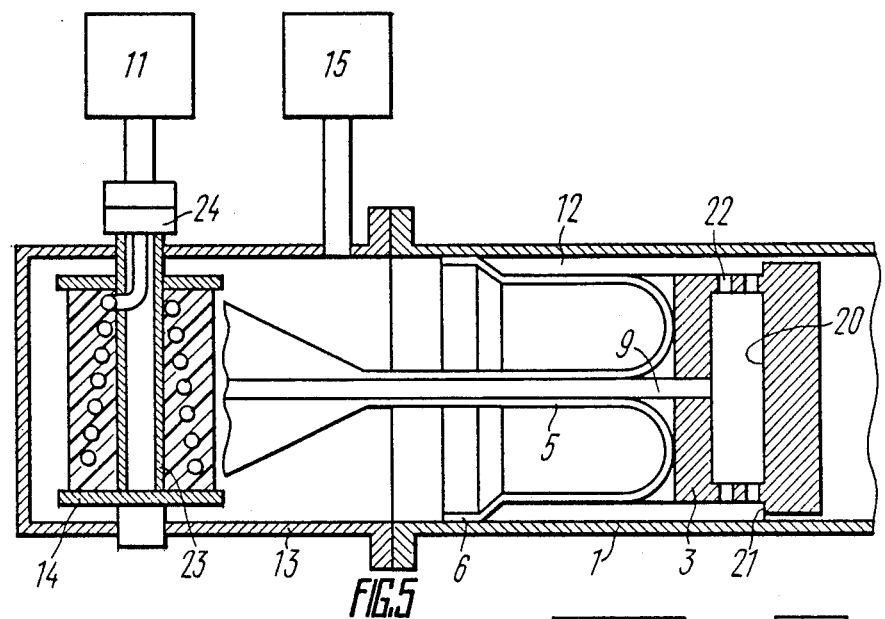
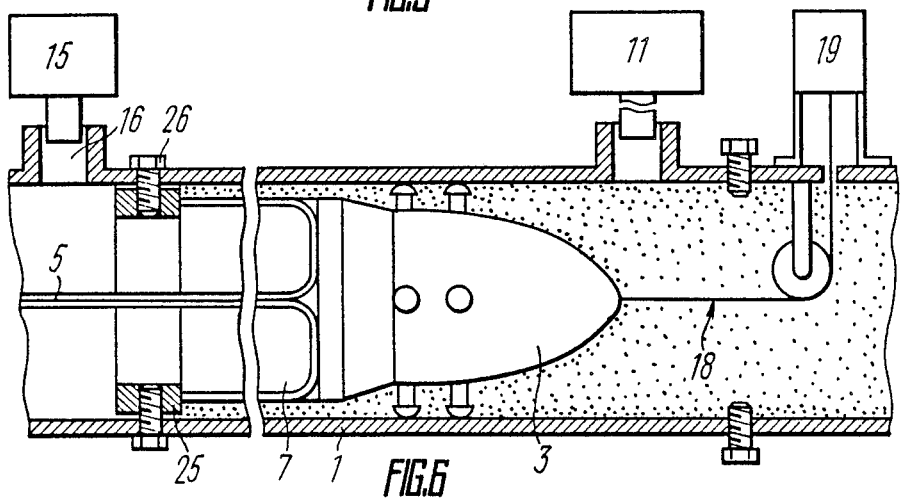

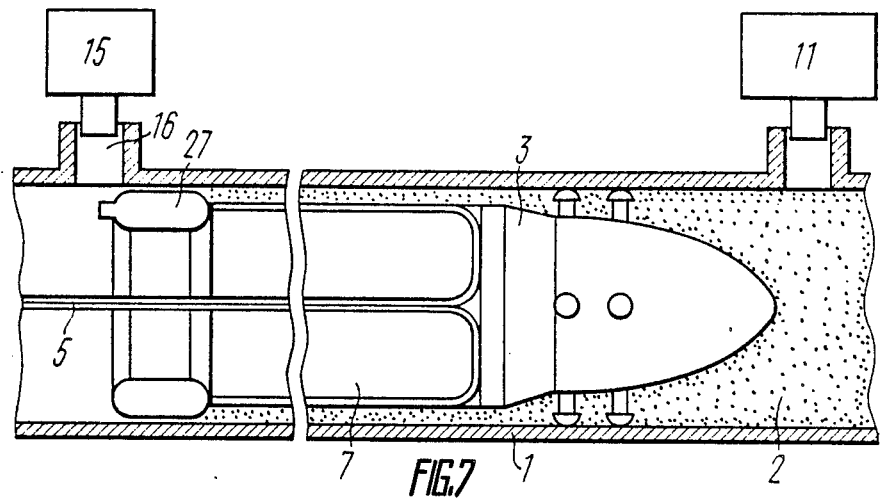
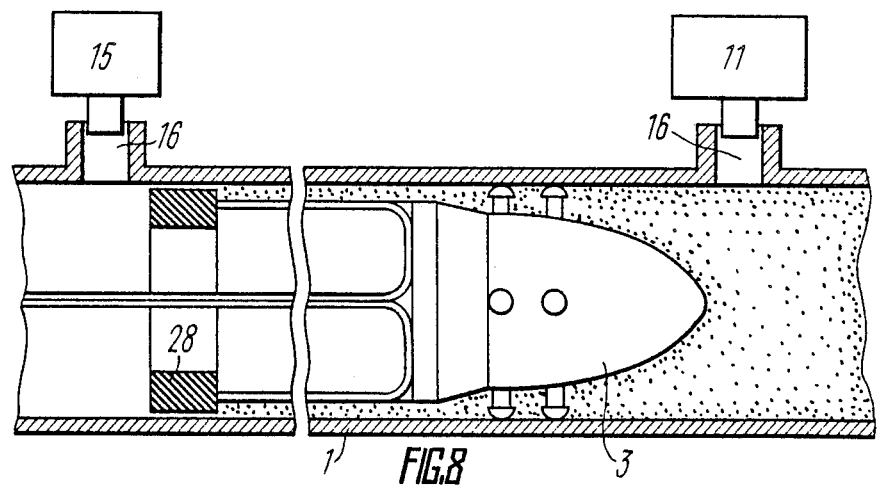

METHOD OF COATING THE INTERNAL SURFACE OF A PIPELINE WITH A CEMENT-SAND MORTAR AND A DEVICE FOR EFFECTING SAME

BACKGROUND OF THE INVENTION

1. Field of the Invention

The present invention relates to the construction and maintenance of pipelines, and, more particularly, to the method of coating the internal surface of a pipeline with a cement-sand-mortar and a device for effecting same.

2. DESCRIPTION OF THE PRIOR ART

Today, there are known in the art the method and device for coating the internal surface of pipelines with a cement-sand mortar (cf. e.g., a booklet by the U.S. Ameron company "A Drawing Method of Restoring Pipelies". Instructions A-101 and A-102).

In accordance with this method and device a layer of mortar is applied on the internal surface of the pipeline in the following manner. A piston is installed in a pipeline with an annular clearance. Prior, the piston the pipeline is filled with a cement-sand mortar. With the aid of a rope the piston is drawn along the pipeline, the mortar is forced out into the clearance between the piston and the pipeline forming a layer. Due to viscosity this mortar is retained on the pipeline wall and once solidified, forms a protecting coating.

However, this method can be used for coating the internal surface of pipelines with up to 250 mm in diameter, because in larger dia. pipelines the formed coating is not held on the internal surface due to an insufficient paving and transverse strength of the layer.

Summary of the Invention

It is the main object of the present invention to develop a method and device for coating the internal surface of a pipeline with a cement-sand mortar which would ensure a reliable bond thereof with the surface of the pipeline, thereby creating a durable coating and protecting pipelines of different diameters.

The main object of the present invention is accomplished by a method of coating the internal surface of the pipeline with the cement-sand mortar, comprising the formation of a mortar layer on the inside of the pipeline by way of feeding and distributing said mortar on the internal surface of the pipeline by means of a moving piston, according to the invention, the formed mortar layer is pressed and held on the pipeline surface with the aid of a flexible hose which is held fixed by its turned-out end to the pipeline and, as the hose is gradually turned out, it is fed to the pipeline being pressed to the mortar layer, the hose being laid simulateneously with the formation of the mortar layer.

According to the invention, the flexible hose is fed, turned out and pressed to the formed mortar layer by a flowing medium which is fed to the cavity formed by the turned out portion of the hose. As this occurs, the flowing medium and the portion of the flexible hose being turned out make up a means for moving the mortar and piston along the pipeline.

The holding of the mortar on the pipeline surface by means of the flexible hose prevents the formed coating from falling off the pipeline wall and this, in turn, makes it possible to increase the thickness of the layer of the coating being formed over one stroke of the piston.

The flexible hose improves the quality of the coating because the formed layer is subjected to pressure of the flowing medium (air) through the base which increases the coating strength. The quality of the coating is also improved because the mortar layer is hardened in the hermetic volume and does not crack. By virtue of the flexible hose the flowing medium also serves as a mover for the piston which appreciably streamlines the technology of applying the coating, reduces the amount of equipment used for applying the coating.

Once the mortar has hardened on the pipeline surface, the flexible hose may be taken off by feeding the flowing medium between the hose and the mortar layer and, having secured the second end of the hose to the pipeline, feed it to the next portion of the latter as the hose is gradually turned out.

Removing the hose from the formed coating, upon its solidification, enables one to cover with one hose the subsequent portions of the pipeline over one stroke of the piston. The hose is removed as it simultaneously moves to the neighbouring section which fact streamlines the technology of forming the coating and makes the equipment less sophisticated.

It is advisable that longitudinal strips of electrochemical soluble alloy be pressed in the layer of the mortar held by the flexible hose, thereby making it possible to additionally protect the pipeline against an aggressive medium. The technology of mounting the strips in the pipeline and obtaining a prior art cathode protection of the pipeline is updated.

It is expedient that a tube be arranged in the flexible hose. This tube along which the mortar is pumped to the piston should be fed to the pipeline together with the hose.

The arrangement of the mortar feed tube in the flexible hose makes it possible to coat long pipelines, each pipeline having one opening. This helps improve the compact size of the device and its operating conditions, and decrease the force necessary for moving the piston.

One can remove the remaining mortar in the pipeline by feeding an elastic plug therethrough using an air flow with a subsequent washing of the pipeline with water.

To effect the method as claimed use is made of the device for coating the internal surface of a pipeline with the cement-sand mortar, which comprises a cement-sand mortar feed system and a piston disposed in the pipeline with an annular clearance to distribute the layer of mortar along the internal surface of the pipeline which, according to the invention, is furnished with a chamber mounted behind the piston in the direction of mortar application, said chamber accommodating a flexible hose whose end has an arrangement to secure it to the airplane, and a flowing medium feed system communicating with said chamber, said flowing medium serving as the means for feeding, turning out and pressing the flexible hose to the mortar layer formed on the surface of the pipeline.

The arrangement for securing the hose end to the pipeline may also be placed at the second end of the hose.

The chamber accommodating the hose makes it possible to coat long pipelines by feeding the working medium thereto, the coating process being automated and its quality improved.

The availability of the hose fixing arrangements at the hose ends enables one to move the hose following the piston with any length of the pipeline, thereby increasing the speed of coating and diminishing auxiliary operations because the number of foundations pits and chambers around the pipeline is reduced as the latter is coated.

It is also expedient that a drum with a hollow shaft and a flexible hose wound thereupon be mounted in the chamber, said hose accommodating a flexible tube by one end communicating via the drum hollow shaft with the mortar feed system and by the other end communicating via through ducts with a cavity made in the piston, the latter having an annular projection.

According to the invention, a second chamber communicating with the flowing medium feed system is mounted in the device. Said chamber houses a mechanism for placing and fixing the protector alloy strips which is made from a piston with slots for the strips and rollers press-fitting the strips in the formed coating.

The flexible tube may communicate with the mortar feed system via a branch pipe having a chamber accommodating an elastic plug, said chamber communicating with the working medium feed system beyond the plug.

BRIEF DESCRIPTION OF THE DRAWINGS

The invention will be more apparent upon considering a detailed exemplary embodiment of the method of coating the internal surface of the pipeline with the cement-sand mortar and the device for effecting same, according to the invention, references being made to the accompanying drawings, wherein:

FIG. 5 shows the device of FIG. 3, with a chamber arranged in the pipeline along the axis thereof;

FIG. 6 is a schematic general view of the device, according to the invention and FIGS. 7 and 8 are the variants of fixing the flexible hose end to the pipeline.

DESCRIPTION OF THE PREFERRED EMBODIMENTS

Figure 1:
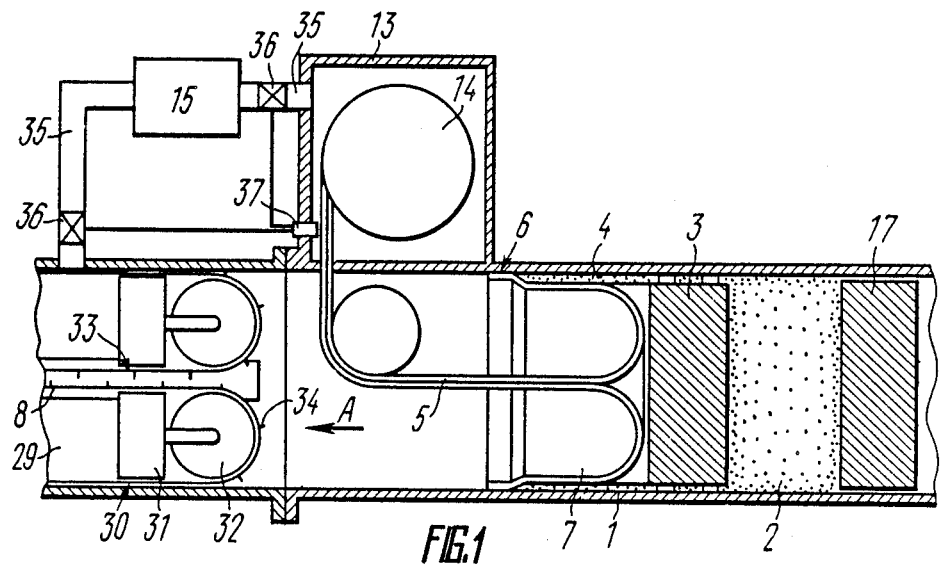
FIG. 1 is a schematic general view of the device for coating the internal surface of the pipeline, a longitudinal section.
Figure 2:
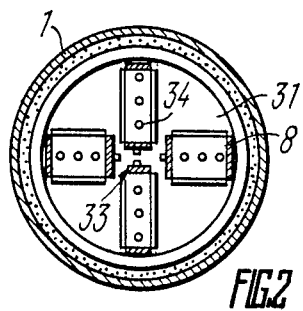
FIG. 2 shows the device of FIG. 1, the view taken along arrow A.

The method of coating the internal surface of the pipeline with the cement-sand mortar resides in that the coating is formed on the surface of a pipeline 1 (FIG. 1) by feeding and distributing a cement-sand mortar 2 on the internal surface of the pipeline by means of a moving piston 3. A formed layer 4 of the mortar is pressed to and held on the pipeline surface with the aid of a flexible hose 5 (sheath) which by an end 6 is secured to the pipeline 1 and turned out before being pressed to the layer 4 of the mortar, the flexible hose 5 being laid simultaneously with the formation of the layer 4 of the mortar. The turned-out portion of the hose makes contact with the piston, as is shown in FIGS. 1, 3, 5, 8, to create a higher pressure in the hose which develops a force pressing the latter to the layer 4 and prevents the rupture of the hose. The flexible hose 5 is made from any prior art material, including polyethylene.

The flexible hose 5 is fed, turned out and pressed to the layer 4 of the mortar by means of a flowing medium (e.g., air) which is fed to a cavity 7 being formed by the turned out portion of the hose 5, said flowing medium (air) and the section of the hose 5 forming a device for moving the mortar 2 and piston 3 along the pipeline 1.

Once the mortar has solidified, i.e., the coating has been formed, the secured end 6 of the hose 5 is disconnected and removed by pumping the air between the hose 5 and the coating formed, said hose can be used at the subsequent portions of the pipeline. For this purpose, the second end of this hose is secured to the pipeline 1 and as the air is fed between the hose and the coating, the hose is disconnected and, as it is turned out, it is taken to the next portion of the pipeline.

If the flexible hose 5 is a component part of the coating, in this case, the hose 5 is not removed and longitudinal strips 8 of an electrochemically soluble alloy of any known composition, e.g., alluminum alloy, comprising (wt. %) magnesium 0.1–1, gallium 0.1 to 3.5, alluminium—the rest, can be press-fitted therein. The alloy of such a composition ensures its dissolution in a neutral medium, e.g., fresh water, creating a negative electrochemical potential between the strip and the material (metal) of the pipeline, the alloy dissolution products are deposited on the surface of the pipeline forming an oxide film thereupon which protects the pipeline against corrosion where there are cracks in the coating.

To reduce the number of operations, as the coating is applied, the flexible tube 9 (FIGS. 3) is fed simultaneously with the flexible hose 5; the cement-sand mortar is pumped to the piston 3 along said tube 9, the latter being arranged in the flexible hose 5. The remaining mortar is removed from the tube 9 by feeding an elastic plug 10 (FIG. 4) therethrough using an air flow with a subsequent washing of the tube with water.

The device, effecting the method as claimed for coating the internal surface of a pipeline with the cement-sand mortar, comprises a system 11 (FIGS. 3, 5) for feeding the cement-sand mortar to the pipeline 1; the piston 3 arranged in the pipeline 1 with an annular clearance 12 for distributing the layer of the mortar along the internal surface of the pipeline 1; a chamber 13 disposed beyond the piston 3 in the direction of the application of the mortar, said chamber accommodating the flexible hose 5 wound on the drum 14. Any prior art system 15 for feeding a flowing medium, e.g, air may be used.

The cement-sand mortar feed system 11 comprises the prior art pump for pumping over cement which communicates with the piston 3 of the pipeline 1 by means of the tube 9 or with the pipeline via an opening 16 (FIGS. 6–8).

The cement-sand mortar feed system 11 is mounted from the outside of the pipeline and feeds the mortar through the opening 16 into the pipeline before the piston 3. The cement-sand mortar may be fed between two pistons 3 and 17, as is shown in FIG. 1, which fact precludes the flow thereof along the pipeline.

The piston 3 can move in the pipeline by various means, e.g., with the air of a pull rope 18 connected with the prior art pull mechanism 19, as is shown in FIG. 6, or by feeding the flowing medium (air) from the system 15 to the turned-out portion of the hose 5, which affects the piston 3 through the hose 5.

Figure 3:
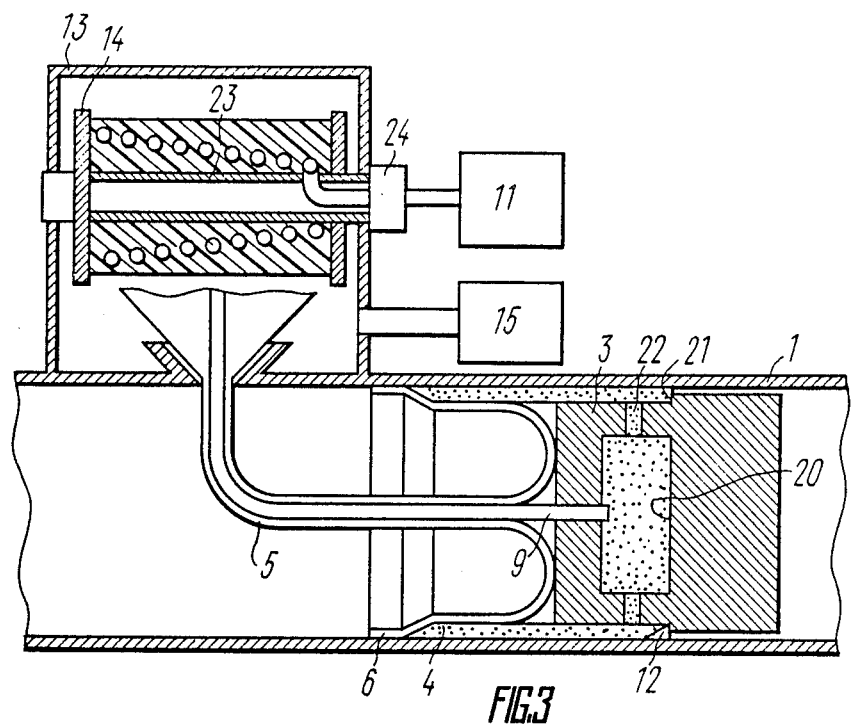
FIG. 3 is another schematic variant of the device, according to the invention, feeding the mortar via the tube in the flexible hose.
Figure 4:
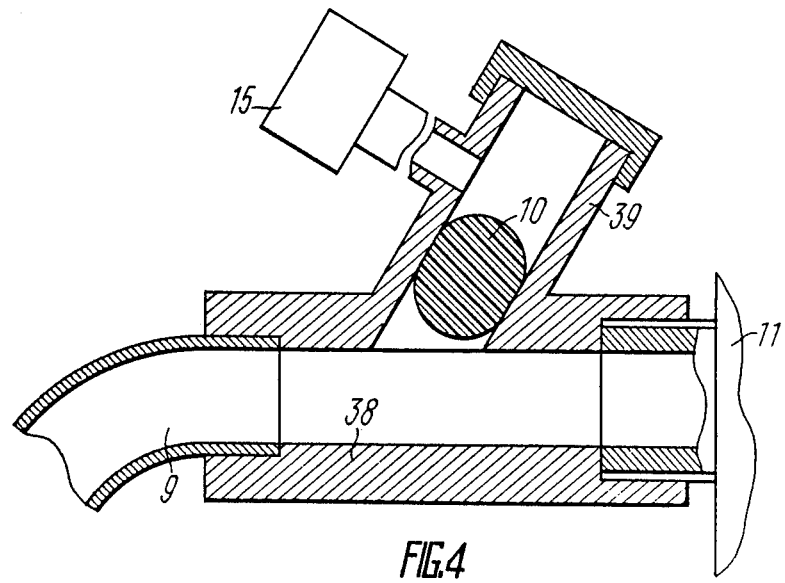
FIG. 4 is a chamber with an elastic plug for removing the mortar from the hose.

The cement-sand mortar may be pumped into a cavity 20 made in the piston 3, as is shown in FIG. 3. The piston 3 is made stepwise or with an annular projection 21. In the step of a lesser diameter provision is made for ducts 22 communicating with the cavity of the piston and the pipeline in the zone of the annular clearance 12. The mortar is fed via the ducts 22 to the annular clearance 12 formed by the body of the piston of the lesser step and the internal surface of the pipeline 1.

The chamber 13 with the flexible hose 5 wound on the drum 14 is mounted beyond the piston 3 in the direction of the mortar application off the pipeline, as is shown in FIGS. 1, 3, or inside the pipeline, as is shown in FIG. 5. Before the hose 5 is wound on the drum 5, the flexible tube 9 for feeding the cement-sand mortar is drawn into the hose, said tube 9 is wound alongside the flexible hose 5 on the drum 14 (the layers of the hose 5 and flexible tube 9 are conventionally shown in FIGS. 3 and 5). One end of the tube 9 is fixed in the piston 3 and communicates via a duct with a cavity 20, the other end of the tube 9 passes through a hollow shaft 23 of the drum 14 and through a rotary seal 24 of and known construction, communicates with the cement-sand feed system 11.

The end 6 of the flexible hose 5 is fitted with the arrangement for fixing it to the pipeline internal surface. This arrangement may have any prior art construction, e.g., it may be made in the form of annular strips 25 (FIG. 6) secured to the pipeline by means of bolts 26, of hermetic elastic chambers 27 (FIG. 7), with a nipple, or sheaths 28 (FIG. 8) from a magnetic elastic material, for example, rubber with a ferrite filler. Before the end 6 of the hose is fixed to the pipeline, this end is turned out, as is shown in FIGS. 1, 3, 5-8, and then it is fixed. If the flexible hose 5 is removed after the solidification of the mortar, this hose is usually used in subsequent portions of the pipeline. Therefore, the second end of such a hose is also fitted with the arrangement to fix it to the pipeline, which is made analogously to the above arrangements.

Arranged in the pipeline 1 beyond the chamber 13 is another chamber 29 (FIG. 1) communicating with the flowing medium feed system 15. Disposed in the chamber 29 is a mechanism 30 for placing and fixing the strips 8 made from an electrochemically soluble alloy, e.g., the alluminum alloy indicated hereinabove.

The mechanism 30 contains a piston 31 with rollers 32 being secured to the front portion of said piston 31 facing the piston 3; the number of said rollers 32 corresponds to that of simultaneously laid strips 8. In the piston 31 provision is made for slots 33 for the strips to pass. Made in the strips are tenons 34 which are pressed in the layer of the cement-sand mortar on the surface of the pipeline through the flexible hose 5.

The flowing medium feed system 15 (FIG. 1) communicates with the chambers 13 and 29 by means of tubes 35 with solenoid valves 36 of any prior art design mounted therein. A limit switch 37 contacting with the hose 5 serves to control the valves.

The flexible tube 9 communicates with the mortar feed system 11 via a branch pipe 38 (FIG. 4) having a chamber 39 communicating therewith, which accommodates the elastic plug 10. Beyond the plug 10 the chamber 39 communicates with the flowing medium feed system 15.

The device as claimed operates as follows.

The end 6 (FIG. 1) of the hose 5 being reeled off the drum 14 is turned out and secured to the internal surface of the pipeline 1.

Pressurized air (e.g., a pressure of 0.8 MPa) is pumped into the cavity 7 formed by the turned out portion of the hose 5 using the system 15. As a result, the hose 5 starts moving along the pipeline 1 pressing the piston 3 which forces out the cement-sand mortar 2 to the annular clearance 12 wherein the layer 4 is formed. Upon the formation of the layer 4, the hose 5 is pressed by the flowing medium (air) to the internal surface of the pipeline 1. Due to the pressure of compressed air in the cavity 7 of the hose 5 the piston 3 (or the piston 3 and 17) moves together with the mortar 2 along the pipeline 1 forming a coating of the cement-sand mortar 2 and the hose 5.

The piston 3 may be additionally moved along the pipeline 1 by means of the pull rope 18 (FIG. 6) using the pull mechanism 19.

As the mortar 2 is consumed, it is periodically pumped by the system 11 into the cavity 20 of the piston 3 along the tube 9 or between the pistons 3 and 17, or directly before the piston 3, as is shown in FIGS. 6-8.

If necessary, an additional electrochemical protection may be formed in the pipeline in the following manner.

Once the whole hose 5 (FIG. 1) has been reeled off the drum 14, the switch 37 switches the solenoid valves 36 and the air begins to enter the cavity of the pipeline 1 disposed behind the piston 31 and shifts the latter along the pipeline 1, the rollers 32 being press-fitted via the hose 5 in the layer 4 of the strip 8. The tenons 34 of the strips 8 pierce through the hose 5 and enter the formed layer 4. In case the air-tightness of the protective coating (layer 4 and hose 5) is disturbed, an electrochemical potential develops between the metal wall of the pipeline 1 and the strips 8 resulting in the dissolution of the strips 8. The dissolution products are settled in the damaged places of coating and seal the latter, whereupon, the strips cease to be dissolved until the next breakdown of the protective coating.

In the event of a failure in feeding the cement-sand mortar 2 along the tube 9, or upon the completion of application of the protective coating, the pressure of the cement-sand mortar in the tube 9 is declined and owing to the pressure of compressed air in the chamber 39 the plug 10 (FIG. 4) begins to move along the tube 9 and remove the mortar therefrom, thereby preventing the possible solidification of the cement-sand mortar in the tube 9.

The hose 5 (FIG. 1) may serve both as a component part of the coating and as a technological hose which is removed upon the solidification of the layer 4. In this case, the hose 5 is removed and may be used at a subsequent portion of the pipeline. For this purpose, the end of the hose 5 is disconnected from the pipeline 1 and the second end thereof arranged in the direction of the formation of the coating is secured to the pipeline 1. Compressed air is pumped by means of the system 15 between the formed layer 4 and the hose 5. As a result, the hose 5 is gradually turned inside out in the place where its second end is fixed to the pipeline and is moved to the next portion of the pipeline 1 pressing and holding the layer 4 being formed on the internal surface of the pipeline 1 until it is solidified.

The method of coating the internal surface of a pipeline with a cement-sand mortar and a device for effecting same may be used in public, agricultural and industrial water supply, as well, as to protect chemical, oil- and gas pipelines against corrosion. The method and device as claimed may be used for applying a 1 to 50 mm thick coating in pipelines of 100 to 6000 mm in diameter.

We claim:

1. Method of coating the internal surface of a pipeline with a cement-sand mortar, comprising the steps of forming a layer (4) of the cement-sand mortar (2) on the internal surface of a pipeline (1); pressing a flexible hose (5) having two ends against said mortar layer (4); connecting a turned out end of said hose to the pipeline (1); compressing a flowing medium in the turned out portion of the hose (5); under pressure of the flowing medium the flexible hose, turning out, moving along the pipeline, and pressing against said layer of the cement-sand mortar formed on the pipeline surface; disposing the piston (3) in the pipeline (1) ahead of the turned out portion of the hose (5) with an annular clearance (12) with respect to the pipeline (1); feeding cement-sand mortar (2) is through the annular clearance (12) between the internal surface of the pipeline (1) and the piston (3) thus forming said mortar layer (4) on the surface of the pipeline, the turned out portion of the flexible hose being permanently maintained in contact with the piston (3) to move it under the action of the flowing medium.

2. A method as in claim 1, characterized in that the flexible hose (5) upon the solidification of the mortar (2) on the pipeline surface is removed by feeding the flowing medium between the hose (5) and the mortar layer (4) and having fixed the second end of the hose to the pipeline so that as it is fed it is gradually turned out, to a subsequent portion of the pipeline.

3. A method as in claim 2, characterized in that a tube is arranged in the flexible hose, said tube being fed together with the hose to the pipeline and serving to pump the mortar to the piston.

4. A method as claimed in claim 3, further comprising the step of removing remaining motar is removed from the tube in the pipeline by feeding an elastic plug therethrough using an air flow with a subsequent washing of the tube with water.

5. A method as in claim 1, characterized in that longitudinal strips (8) from an electrochemically soluble alloy are pressed in the layer (4) of the mortar held by the flexible hose (5).

6. A method as in claim 5, characterized in that a tube is arranged in the flexible hose, said tube being fed together with the hose to the pipeline and serving to pump the mortar to the piston.

7. A method as claimed in claim 6, further comprising the step of removing remaining motar is removed from the pipeline by feeding an elastic plug therethrough using an air flow with a subsequent washing of the tube with water.

8. A method as in claim 1, characterized in that a tube (9) is arranged in the flexible hose (5), said tube being fed together with the hose (5) to the pipeline (1) and serving to pump the mortar (2) to the piston (3).

9. A method as claimed in claim 8, further comprising the step of removing remaining mortar from the tube (9) in the pipeline (1) by feeding an elastic plug (10) therethrough using an air flow with a subsequent washing of the tube with water.

10. A device for coating the internal surface of a pipeline with a cement-sand mortar, comprising a system (11) for feeding the cement-sand mortar into the pipeline; a chamber (13) with a flexible hose (5), having two ends, disposed therein, one end of said flexible hose being provided with an arrangement for attachment to the pipeline and being preliminary turned out; a system (15) for feeding the flowing medium which communicates with a space formed by the turned out hose; a piston (3) disposed in the pipeline ahead of said turned out portion of said hose in permanent contact with said turned out portion of said hose, said piston (3) having a diameter less than the inner diameter of the pipeline and being provided with projections (21) contacting with the internal surface of the pipeline and maintaining a preset annular clearance (12) between said piston and the pipeline surface, said flexible hose (5) and the flowing medium forming means moving the piston along the pipeline so that the cement-sand mortar is pressed out through said annular clearance (12) between said piston and the pipeline thereby forming a cement-sand layer on the surface of the pipeline, which layer is then supported by the turned-out portion of said flexible hose (5).

11. A device as claimed in claim 10, characterized in that in the chamber (13) provision is made for a drum (14) with a hollow shaft and a flexible hose (5) wound thereupon accommodating a flexible tube (9) by one end communicating with the mortar feed system (11) via the drum (14) hollow shaft and by the other end communicating via through ducts with a cavity (20) made in the piston (3), said piston (3) having an annular projection.

12. A device as claimed in any of the claim 11, characterized in that a second chamber (29) is arranged which communicates with the flowing medium feed system (15), said second chamber accommodating the mechanism for placing and fixing strips (8) from an electrochemically soluble alloy, said mechanism made up from a piston (31) with slots (33) for the strips to pass and rollers (32) for press-fitting said strips (8) in the coating formed.

13. A device as claimed in claim 11, characterized in that the flexible tube (9) communicates with the mortar feed system (11) via a branch pipe (38), having a chamber (39) accommodating an elastic plug (10), the chamber (39) communicating with the flowing medium feed system (11) beyond said plug (10).

* * * * *